United States Patent
Kmetz et al.

(10) Patent No.: US 9,533,918 B2
(45) Date of Patent: Jan. 3, 2017

(54) METHOD FOR FABRICATING CERAMIC MATERIAL

(75) Inventors: Michael A. Kmetz, Colchester, CT (US); Timothy P. Coons, Narragansett, RI (US); Justin W. Reutenauer, Branford, CT (US)

(73) Assignee: United Technologies Corporation, Hartford, CT (US)

( * ) Notice: Subject to any disclaimer, the term of this patent is extended or adjusted under 35 U.S.C. 154(b) by 1124 days.

(21) Appl. No.: 13/250,084

(22) Filed: Sep. 30, 2011

(65) Prior Publication Data

US 2013/0082426 A1    Apr. 4, 2013

(51) Int. Cl.
| | | |
|---|---|---|
| C04B 35/65 | (2006.01) | |
| C04B 35/589 | (2006.01) | |
| C04B 35/591 | (2006.01) | |
| C04B 35/80 | (2006.01) | |
| C04B 35/628 | (2006.01) | |

(52) U.S. Cl.
CPC .......... *C04B 35/589* (2013.01); *C04B 35/591* (2013.01); *C04B 35/62863* (2013.01); *C04B 35/62868* (2013.01); *C04B 35/62871* (2013.01); *C04B 35/62894* (2013.01); *C04B 35/62897* (2013.01); *C04B 35/806* (2013.01); *C04B 2235/3843* (2013.01); *C04B 2235/3865* (2013.01); *C04B 2235/3886* (2013.01); *C04B 2235/3891* (2013.01); *C04B 2235/40* (2013.01); *C04B 2235/402* (2013.01); *C04B 2235/404* (2013.01); *C04B 2235/522* (2013.01); *C04B 2235/524* (2013.01); *C04B 2235/5244* (2013.01); *C04B 2235/5436* (2013.01)
(Continued)

(58) Field of Classification Search
CPC .. C04B 41/4554; C04B 41/5066; C04B 41/45; C04B 41/81; C04B 14/38
USPC ........... 264/624, 603, 628, 640; 106/287.14, 106/287.15, 287.11
See application file for complete search history.

(56) References Cited

U.S. PATENT DOCUMENTS 4,952,715 A * 8/1990 Blum ...................... C04B 35/16
528/15
5,055,431 A * 10/1991 Blum ...................... C04B 35/16
264/624
(Continued)

FOREIGN PATENT DOCUMENTS

EP    0412428 A1    2/1991
EP    2308811 A1    4/2011

OTHER PUBLICATIONS

Forrest, et al., Special Ceramics 5, Proceedings of the Fifth Symposium on Special Ceramics held by The British Ceramic Research Association at Queens Road, Penkhull, Stroke-on-Trent, pp. 99-123.
(Continued)

*Primary Examiner* — Nahida Sultana
(74) *Attorney, Agent, or Firm* — Carlson, Gaskey & Olds, P.C.

(57) ABSTRACT

A method for a fabricating a ceramic material includes providing a mixture of a reactive metallic filler material with a preceramic polysilazane material. The preceramic polysilazane material is then polymerized to form a green body. The green body is then thermally treated in an environment that is substantially free of oxygen to convert the polymerized preceramic polysilazane material into a ceramic material that includes at least one nitride phase that is a reaction product of the reactive metallic filler material and a preceramic polysilazane material.

15 Claims, 2 Drawing Sheets

(56) References Cited

U.S. PATENT DOCUMENTS

| | | | | |
|---|---|---|---|---|
| 5,139,717 | A | * | 8/1992 | Peuckert ............... C04B 35/589 264/624 |
| 5,173,367 | A | | 12/1992 | Liimatta et al. |
| 5,208,284 | A | * | 5/1993 | Niebylski ..................... 524/382 |
| 5,616,650 | A | * | 4/1997 | Becker .................. C08G 18/10 525/102 |
| 5,635,250 | A | | 6/1997 | Blum et al. |
| 5,654,246 | A | | 8/1997 | Newkirk et al. |
| 5,665,484 | A | * | 9/1997 | Bolger .................... H01M 2/38 429/62 |
| 5,707,471 | A | | 1/1998 | Petrak et al. |
| 5,711,987 | A | * | 1/1998 | Bearinger ............. H01L 23/296 257/E23.12 |
| 5,747,623 | A | * | 5/1998 | Matsuo ................. C03C 17/007 525/474 |
| 5,851,677 | A | * | 12/1998 | Laurent et al. ............... 428/446 |
| 5,922,411 | A | * | 7/1999 | Shimizu .................. C03C 17/25 257/E21.263 |
| 5,948,348 | A | * | 9/1999 | Semff .................... C04B 35/589 264/257 |
| 6,228,453 | B1 | | 5/2001 | Fareed et al. |
| 6,350,713 | B1 | | 2/2002 | Petrak |
| 2002/0019306 | A1 | * | 2/2002 | Petrak .................. C04B 35/581 501/95.2 |
| 2002/0035026 | A1 | * | 3/2002 | Greil ....................... C04B 35/14 501/88 |
| 2003/0092557 | A1 | * | 5/2003 | Aichele ................. B82Y 30/00 501/87 |
| 2003/0194574 | A1 | * | 10/2003 | Thebault et al. ............. 428/472 |
| 2005/0279255 | A1 | * | 12/2005 | Suzuki et al. ........... 106/287.11 |
| 2007/0116968 | A1 | * | 5/2007 | Dierdorf et al. .............. 428/446 |
| 2007/0117892 | A1 | * | 5/2007 | Aoki et al. .................... 524/236 |
| 2008/0014461 | A1 | * | 1/2008 | Brand .................... C08G 77/62 428/642 |
| 2009/0098300 | A1 | * | 4/2009 | Brand .................. C09D 183/16 427/387 |
| 2009/0317548 | A1 | * | 12/2009 | Meier ........................ 427/248.1 |
| 2010/0331487 | A1 | * | 12/2010 | Yang et al. .................... 524/858 |
| 2015/0017335 | A1 | * | 1/2015 | Werner ............... C09D 183/16 427/385.5 |

OTHER PUBLICATIONS

Heidenreich, "Melt Infiltration Process", Ceramic Matrix Composites, pp. 113-139.

Pompe, "A Thermoanalytical Study of the Alpha and Beta Forms of Silicon Nitride", Thermochimica Acta, 27 (1978) 155-163.

Drevet et al., "Wetting and Adhesion of Si on Si3N4 and BN Substrates", Journal of the European Ceramic Society 29 (2009) 2363-2367.

Kawai, et al. "Mechanical and Thermal Properties of Al—Si3N4 Composites Fabricated by the infiltration of molten Al into a Porous Si3N4 Ceramic with Network" Journal of Materials Science Letters 20, 2001, 385-388.

Simon et al. "Mechanical and Structural Characterization of the Nicalon Silicon Carbide Fibre" Journal of Materials Science 19 (1984) 3649-3657.

Hill et al., "Interfacial Processing Via CVD for Nicalon Based Ceramic Matrix Composites", University of Connecticut, 12 pp.

Hongli et al. "Fabrication of Self-Healing Ceramic Coating Against Oxidation for Carbon/Carbon Composite Using Polysilazane and Fillers", Advanced Materials Research vols. 79-82 (2009) pp. 775-778.

Behrendt et al. "Effect of Carbon Preform Pore Volume and Infiltrants on the Composition of Reaction-Formed Silicon Carbide Materials", Journal of Materials Synthesis and Process, vol. 2, No. 2, 1994, pp. 117-123.

Pyzik et al., "Composition Control in Aluminum Boron Carbide Composites", Dow Automotive, 16 pp.

Krenkel et al. "C/C—SiC Composites for Space Applications and Advanced Friction Systems", Materials Science and Engineering A 412 (2005), 177-181.

Whalen et al. "Wetting of SiC, Si3N4, and Carbon by Si and Binary Si Alloys", Journal of the America Ceramic Society, vol. 58, No. 9-10, pp. 396-399.

Extended European Search Report for European Patent Application No. 12186439.1 completed Apr. 11, 2013.

Stantschev G, et al., "Long Fibre Reinforced Ceramics With Active Fillers and a Modified Intra-Matrix Bond Based on the LPI Process", Journal of the European Ceramic Society, Elsevier Science Publishers, Barking Essex, GB vol. 25, No. 2-3, Jan. 1, 2005, pp. 205-209.

Zhengfang Xie, et al., "Active Filler (Aluminum-Aluminum Nitride) Controlled Polycarbosilane Pyrolysis", Journal of Inorganic and Organometallic Polymers, Kluwer Academic Publishers-Plenum Publishers, NE, vol. 16, No. 1, Jun. 7, 2006, pp. 69-81.

Jessica D. Torrey et al., "Composite Polymer Derived Ceramic System for Oxidizing Environments", Journal of Materials Science, Kluwer vol. 41, No. 14, Jun. 30, 2006, pp. 4617-4622.

* cited by examiner

METHOD FOR FABRICATING CERAMIC MATERIAL

BACKGROUND

This disclosure relates to ceramic processing and, more particularly, to ceramic processing using preceramic polymers. Ceramic materials are known and used for components such as coatings, ceramic bodies, and ceramic matrices. Many ceramic components are produced by powder processing and sintering. However, powder processing can limit the chemistry or microstructure of the ceramic component and it can be difficult to form complex geometry components in near net shape using powder processing.

SUMMARY

Disclosed is a method for a fabricating a ceramic material. The method includes providing a mixture of a reactive metallic filler material with a preceramic polysilazane material. The preceramic polysilazane material is then polymerized to form a green body. The green body is then thermally treated in an environment that is substantially free of oxygen to convert the polymerized preceramic polysilazane material into a ceramic material that includes at least one nitride phase that is a reaction product of the reactive metallic filler material and the preceramic polysilazane material.

The reactive metallic filler material can be selected from aluminum metal, titanium metal and combinations thereof, and the mixture can be infiltrated into pores of a fibrous structure.

In another aspect, the mixture has up to 40 weight percent of the reactive metallic filler material, and the fibrous structure has coated fibers that define a coating thickness. The amount of the reactive metallic filler material in the mixture and the coating thickness are selected such that a ratio of the coating thickness to the amount of reactive metallic filler material is within a predetermined range.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
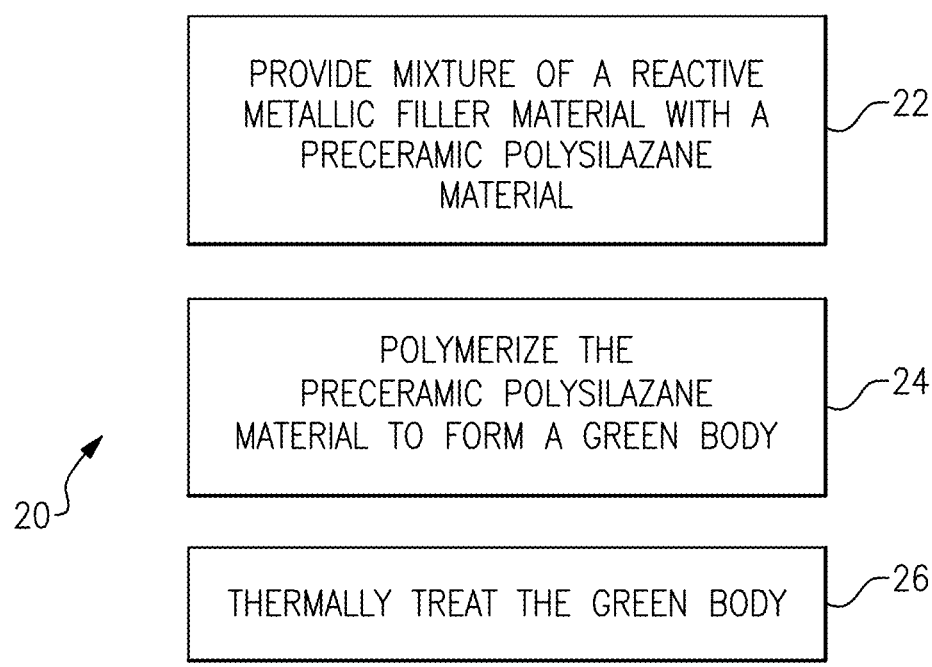
FIG. 1 shows an example method for fabricating a ceramic material.

FIG. 1 illustrates selected portions of an example method 20 for fabricating a ceramic material. As described below, the exemplary method 20 utilizes a preceramic polymer and provides the ability to fabricate near net shape ceramic components with complex geometries, unique chemistries and/or unique microstructures.

As shown, the method 20 generally includes a mixture step 22, a polymerization step 24 and a thermal treatment step 26. It is to be understood, however, that the illustrated steps 22, 24 and 26 may include sub-steps or may be combined with other steps in the processing of a ceramic material.

The mixture step 22 includes providing a mixture of a reactive metallic filler material with a preceramic polysilazane material. In one example, the mixture is pre-made and the action of providing the mixture entails obtaining the mixture for use in the subsequent steps 24 and 26. Alternatively, the mixture step 22 includes the action of mixing the reactive metallic filler material with the preceramic polysilazane material. For instance, a predetermined amount of the reactive filler material is added to a predetermined amount of the preceramic polysilazane material and stirred over heat. The mixture is stirred until the reactive metallic filler material is uniformly dispersed throughout the preceramic polysilazane material. Optionally, the mixing is conducted in an inert environment, such as under vacuum or in an inert, substantially oxygen-free cover gas to limit exposure of the reactive metal filler material to air and moisture.

The selected reactive metallic filler material is reactive with regard to the selected preceramic polysilazane material. That is, during subsequent processing to convert the preceramic polysilazane material into ceramic material, the reactive metallic filler material and the preceramic polysilazane material react to form a ceramic phase in the final ceramic material. In one example, the reactive metallic filler material is selected from aluminum metal, titanium metal or combinations thereof.

In a further example, the amount of the reactive metallic filler material is selected such that the material is generally uniformly dispersed through the preceramic polysilazane material. The reactive metallic filler material, such as aluminum powder or titanium powder, tends to settle to the bottom of the mixture due to gravitational forces. Thus, if the amount is too high, at least a portion of the reactive metallic filler material will sink to bottom and the final ceramic material will ultimately have poor mechanical integrity. In one embodiment, the mixture has up to 40 weight percent of the reactive metallic filler material. In a further example, the mixture has 10-30 weight percent, and in another example the mixture has 15-25 weight percent, such as approximately 20 weight percent.

In a further embodiment, the reactive metallic filler material is a metallic powder that has a preselected average particle size. The selected average particle size is a balance between the reactivity of the powder and the ability of the powder to be suspended in mixture with the preceramic polysilazane material. For instance, if the average particle size is relatively large, the particles are relatively less reactive with the preceramic polysilazane material and tend to sink to the bottom of the mixture. On the other hand, if the particles are very small, the powder has less of a tendency to sink in the mixture but is more reactive with moisture or oxygen from the surrounding environment. Given this description, one of ordinary skill in the art will be able to identify suitable average particle sizes for their intended application and process. In one example, the reactive metallic filler material is aluminum powder, titanium powder or a mixture thereof and the average particle size is 5-30 micrometers. In a further embodiment, the average particle size is 13-17 micrometers.

The preceramic polysilazane material is a polymer or oligomer ceramic precursor in which silicon and nitrogen atoms are bonded to each other to form the basic backbone of the material. As an example, the preceramic polymer is hydridopolysilazane, which decomposes in a nitrogen-containing atmosphere to predominantly silicon carbonitride (SiNC). In some embodiments, the preceramic polysilazane material includes only the polymer or oligomer silicon/nitrogen structure. Alternatively, the preceramic polysilazane material includes additives to enhance or change the processing or ceramic material properties. In one example, the preceramic polysilazane material includes a catalyst material, such as dicumyl peroxide, that modifies the processing temperatures at which the material is polymerized and/or pyrolyzed.

As indicated above, additional steps may be used in combination with the steps of the method 20. Thus, it is contemplated that the method 20 include one or more additional steps to form the mixture for the desired end use, such as, but not limited to, coatings, monolithic components, fiber-reinforced components, etc. In one example, the method 20 additionally includes infiltrating the mixture into pores of a fibrous structure. For example, the fibrous structure is a stack of continuous fiber sheets or a three-dimensional preform. In a further example, a plurality of fibrous sheets are impregnated with the mixture and then arranged in a desired orientation relative to one another (e.g., crossplied). The stack is then heated to polymerize the preceramic polymer. The process is not limited to any particular technique, but in some examples, a vacuum bag technique or hot press technique is used.

The fibers of fibrous structure are selected for the intended end use. In some examples, the fibers are ceramic or carbon fibers. In further examples, the fibers are oxide or non-oxide ceramic fibers. In additional embodiments, the fibers are or include glass, carbide, nitride, boride, carbonitride, carboboride, boronitride or the like. In embodiments, the fibers are or include a silicon-containing ceramic material, such as silicon carbide.

In a further example, the fibers are non-oxide ceramic fibers, which are susceptible to oxidation under relatively severe end use operating conditions such as those found in turbine engines. Thus, in some examples, the fibers are coated by known techniques with a protective coating that serves as a getter material to intercept oxygen, as an oxygen barrier or both.

In a further example, the protective coating is a multi-layer coating that includes at least a layer of a first ceramic material and a layer of a second ceramic material. For instance, the coating includes a boron nitride (BN) layer directly on the perimeter surface of the fibers and a silicon nitride layer ($Si_3N_4$) over the boron nitride layer. That is, the boron nitride layer is between the silicon nitride layer and the fibers. In other examples, the protective coating can include additional layers or alternating layers of boron nitride and silicon nitride. In embodiments, the layer of boron nitride has a thickness of approximately 300-500 nanometers and the layer of silicon nitride has a thickness of approximately 75-600 nanometers. In further examples, the thickness of the silicon nitride layer is 75, 150 or 225 nanometers. Given this description, one of ordinary skill in the art will be able to select other suitable thicknesses for the layers to meet their particular needs.

Turning to the polymerization step 24, the mixture of the reactive metallic filler material and the preceramic polysilazane material is polymerized to form a green body. A "green body" refers to the preceramic compound prior to thermal treatment to consolidate or form the ceramic material. In one example, the polymerization step 24 includes heating the mixture at a first temperature to polymerize (e.g., crosslink) the preceramic polysilazane material. That is, the heating "sets" the mixture. The selected temperature depends upon the particular polysilazane material that is selected and whether the material contains a catalyst. In general, the polymerization temperature is within a range of approximately 100-300° C. (212-572° F.).

After polymerization, the green body is thermally treated at step 26 in an environment that is substantially free of oxygen to convert the polymerized preceramic polysilazane material into a ceramic material. That is, the process environment includes only trace amounts of oxygen in the selected process gas or gases. The processing environment and process temperature selected depends on the desired end ceramic material. For example, in a nitrogen-containing environment, the preceramic polymer generally decomposes to form silicon carbonitride. With lower nitrogen concentration or a substantial absence of nitrogen, other phases can be more predominantly formed, such as silicon carbide.

In embodiments, the thermal treatment is conducted at a temperature of approximately 800-1200° C. (1472-2192° F.). However, the selected temperature depends on the selected preceramic polymer, the desired decomposition products and fiber composition (if used). In one example, a silicon carbide fiber structure with a multi-layer protective coating of boron nitride/silicon nitride was infiltrated with the mixture described above having aluminum metal powder to produce a green body. The green body was treated in a hot wall reactor by heating to 900° C./1652° F. at a heating rate of 2.5° C./minute under flowing nitrogen. Upon reaching the target temperature, the target temperature was held for a soak time of approximately one hour.

In a further example, the steps of infiltration and thermal treatment are repeated between two and ten cycles to form a fully dense ceramic material. In one variation, the initial infiltration is conducted with the mixture described above and subsequent infiltrations are conducted with "undoped" preceramic polymer that does not include any of the reactive metallic filler material. A substantial portion of the weight gain of the structure occurs in the initial cycle and further infiltrations with the mixture thus only add a limited amount of additional reactive metallic filler material. In one example using a silicon carbide fiber structure with a multi-layer protective coating of boron nitride/silicon nitride, aluminum metal powder and hydridopolysilazane, the final density was approximately 1.6-2.0 grams per cubic centimeter. Subsequent cycles can alternatively be conducted with the mixture if there is a desire to maximize the amount of reactive metallic filler material.

During the thermal treatment step 26, the reactive metallic filler material reacts with the preceramic polysilazane material to form at least one nitride phase. Thus, the nitride phase is a reaction product of the reactive metallic filler material and the preceramic polysilazane material. The chemistry of the nitride phase that is formed depends upon the selected thermal treatment temperature, selected process gas, selected reactive metallic filler material and selected preceramic polysilazane material, for example.

In one example using nitrogen process gas at the disclosed thermal treatment temperature and hydridopolysilazane as the preceramic polymer, the nitride phase includes aluminum nitride (AlN) when reactive metallic filler material includes aluminum metal. The formation of aluminum nitride causes a volume expansion, which is expected to increase the density of the ceramic material and reduce microcracking. In a similar example, the nitride phase includes titanium nitride (TiN) when the reactive metallic filler material includes titanium metal.

The reaction between the reactive metallic filler material and the preceramic polysilazane material also produces other ceramic or non-ceramic phases, such as silicon carbide, titanium carbide, silicides of the reactive metal, and free silicon metal. Thus, the method 20 permits the use of free silicon metal in fibrous ceramic materials without having to melt and infiltrate the silicon metal in the fibrous structure. With non-oxide fibers in particular, such as silicon carbide, the high melting and processing temperature of silicon metal (approximately 1415° C./2579° F.) damages the fibers.

In embodiments that utilize a fibrous structure, the thermal treatment can also cause reactions between the reactive metallic filler material and the fibers or protective coating. In one example where the coated fibers include the multi-layer coating of boron nitride and silicon nitride, the reactive metallic filler material reacts with the silicon nitride layer to the detriment of the strength of the composite that is formed. In some examples, to mitigate the effects of the reaction, a thicker-than-normal silicon nitride layer was used.

In a further example, the effect of the reaction between the reactive metallic filler material and the silicon nitride layer is mitigated by selecting a predetermined ratio between the thickness of the silicon nitride layer and the amount of reactive metallic filler material that is used. In one example, the amount in weight percent of reactive metallic filler material represented by the variable X and the coating thickness in nanometers represented by the variable $t_{coating}$ are selected such that a ratio of $t_{coating}/X$ (coating thickness divided by weight percent of the reactive filler material) is from 3.75 to 25. In a further example, the ratio is from 10 to 20. Thus, the ratio represents a desirable balance between the amount of reactive metallic filler material and the thickness of the coating that is needed to mitigate the effects of the reaction between the reactive metallic filler material and the coating.

Figure 2:
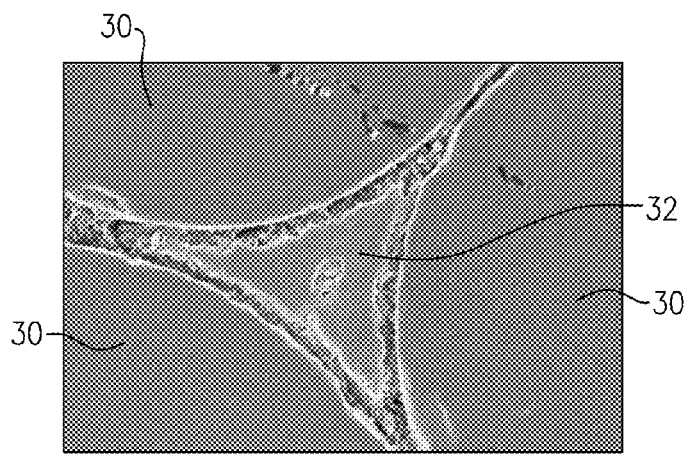
FIG. 2 shows a micrograph of a ceramic material fabricated according to the method shown in FIG. 1.
Figure 3:
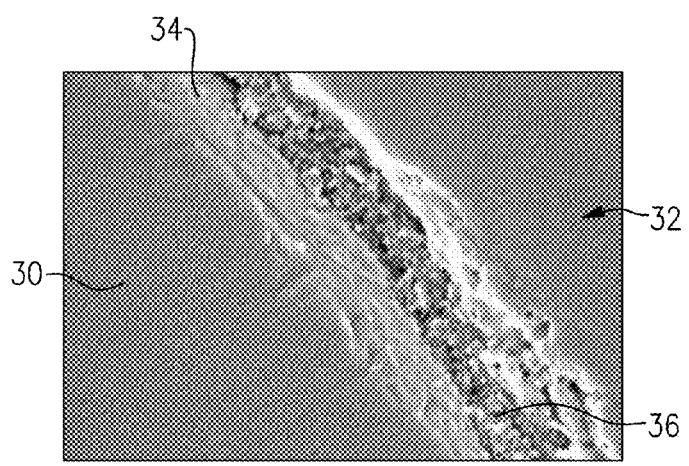
FIG. 3 shows the ceramic material of FIG. 2 at a greater magnification.

FIG. 2 illustrates a micrograph of a ceramic material that was fabricated according to the method 20 described above. In this example, the ceramic material includes fibers 30 that are generally embedded within a matrix 32. As also seen at higher magnification in FIG. 3, the fibers 30 in this example are coated and include a boron nitride layer 34 that is directly on the surfaces of the fibers 30 and a silicon nitride layer 36 over the boron nitride layer 34.

Figure 4:
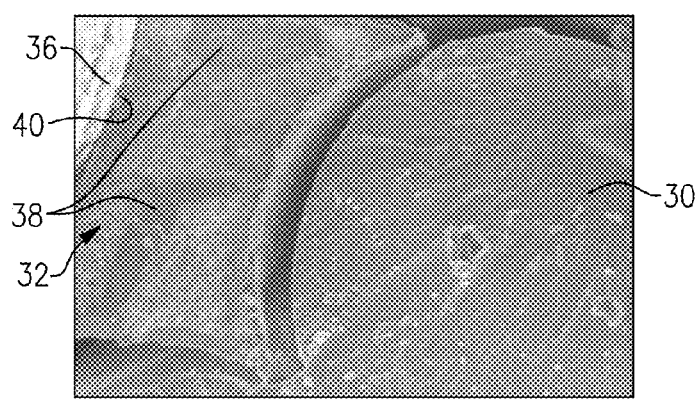
FIG. 4 shows a micrograph of a fracture surface of a ceramic material fabricated according to the method shown in FIG. 1.

FIG. 4 shows a micrograph of a fracture surface of the ceramic material. As shown, the matrix 32 includes several reaction zones 38 (darker areas) where the reactive metallic filler material has reacted with the preceramic polysilazane material to form at least one nitride phase. The illustrated example also shows a reaction zone 40 at an interface between the matrix 32 and the silicon nitride layer 36 where the reactive metallic filler material reacted with the silicon nitride layer 36.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for fabricating a ceramic material, the method comprising:
   proving a mixture of a reactive filler with a preceramic polysilazanes material, wherein the reactive filler is selected from the group consisting of aluminum filler metal powder, titanium filler metal powder and combinations thereof; and wherein the mixture has an amount of up to 40 weight percent of reactive filler;
   infiltrating the mixture into pores of a fibrous structure that has coated fibers, wherein the coating on the coated fibers has an coating thickness, represented as a variable $t_{coating}$ (nanometers) and the mixture has an amount, represented by a variable X (weight percent), of the reactive filler, and wherein X and $t_{coating}$ are selected such that a ratio of $t_{coating}/X$ (coating thickness in nanometers divided by weight percent of the reactive filler) is from 3.75 to 25;
   polymerizing the preceramic polysilazanes material to form a green body; and thermally treating the green body in an environment that is substantially free of oxygen to convert the polymerized preceramic polysilazane material into a ceramic material including at least one nitride phase that is a reaction product of the reactive filler and the preceramic polysilazane material.

2. The method as recited in claim 1, wherein the nitride phase includes aluminum nitride if the reactive filler includes the aluminum filler metal powder, and the nitride phase includes titanium nitride if the reactive filler includes the titanium filler metal powder.

3. The method as recited in claim 2, wherein the thermal treating of the green body reacts the reactive filler with the preceramic polysilazane material to produce free silicon metal.

4. The method as recited in claim 1, including infiltrating the mixture into pores of a fibrous structure.

5. The method as recited in claim 1, including polymerizing the preceramic polysilazane material at a first temperature, and thermally treating the green body at a second, higher temperature.

6. The method recited in claim 1, wherein the amount is 10-30 weight percent.

7. The method as recited in claim 1, wherein the amount is 15-25 weight percent.

8. The method as recited in claim 1, wherein the reactive filler is a powder that has an average particle size of 5-30 micrometers.

9. The method recited in claim 1, wherein the fibrous structure has coated fibers and the coating includes a layer of silicon nitride that is in contact with the mixture upon filtration of the mixture into the pores, and a layer of boron nitride that is located between the layer of silicon nitride and the fibers.

10. A method for fabricating a ceramic material, the method comprising:
    providing a mixture of a reactive filler with a preceramic polysilazane material, wherein the mixture has an amount, represented by a variable X, of up to 40 weight percent of the reactive filler;
    infiltrating the mixture into pores of a fibrous structure that has coated fibers, wherein the coating on the coated fibers has a coating thickness represented by a variable $t_{coating}$ (nanometers);
    selecting X and $t_{coating}$ such that a ratio of $t_{coating}/X$ (coating thickness in nanometers divided by weight percentage of reactive filler material) is from 3.75 to 25;

polymerizing the preceramic polysilazane material to form a green body; and thermally treating the green body in an environment that is substantially free of oxygen to convert the polymerized preceramic polysilazane material into a ceramic material including at least one nitride phase that is a reaction product of the reactive filler and the preceramic polysilazane material.

11. The method as recited in claim 10, wherein the ratio is from 10 to 20.

12. The method as recited in claim 11, wherein the coating includes a layer of silicon nitride that is in contact with the mixture upon infiltration of the mixture into the pores, and the coating thickness is of the layer of silicon nitride.

13. The method as recited in claim 1, wherein the reactive filler is the aluminum filler metal powder.

14. The method as recited in claim 1, wherein the reactive filler is the titanium filler metal powder.

15. The method as recited in claim 10, including controlling the effects of a reaction between the reactive filler and the coating on the fibers by selecting the ratio from 3.75 to 25.

\* \* \* \* \*

UNITED STATES PATENT AND TRADEMARK OFFICE
CERTIFICATE OF CORRECTION

PATENT NO. : 9,533,918 B2
APPLICATION NO. : 13/250084
DATED : January 3, 2017
INVENTOR(S) : Michael A. Kmetz Page 1 of 1

It is certified that error appears in the above-identified patent and that said Letters Patent is hereby corrected as shown below:

In the Claims

In Claim 1, Column 6, Line 11; "the coating" should read as --a coating--

In Claim 10, Column 6, Line 61; "the coating" should read as --a coating--

In Claim 15, Column 7, Line 20; prior to "effects" delete "the"

Signed and Sealed this
Eleventh Day of April, 2017

Michelle K. Lee
*Director of the United States Patent and Trademark Office*